(12) United States Patent
Baumgartner et al.

(10) Patent No.: US 10,224,795 B2
(45) Date of Patent: Mar. 5, 2019

(54) MOTOR ASSEMBLY (71) Applicant: BROSE FAHRZEUGTEILE GMBH & CO. KOMMANDITGESELLSCHAFT, WUERZBURG, Wuerzburg (DE)

(72) Inventors: Joachim Baumgartner, Volkach (DE); Stephan Roos, Wertheim-Hoehefeld (DE)

(73) Assignee: Brose Fahrzeugteile GmbH & Co. Kommanditgesellschaft, Wuerzburg (DE)

( * ) Notice: Subject to any disclaimer, the term of this patent is extended or adjusted under 35 U.S.C. 154(b) by 74 days.

(21) Appl. No.: 15/055,823

(22) Filed: Feb. 29, 2016

(65) Prior Publication Data
US 2016/0254720 A1  Sep. 1, 2016

(30) Foreign Application Priority Data

Sep. 4, 2015 (DE) .......... 10 2015 217 019
Sep. 30, 2015 (DE) .......... 10 2015 218 960

(51) Int. Cl.
H02K 5/04 (2006.01)
H02K 11/33 (2016.01)
H02K 29/08 (2006.01)
H02K 7/116 (2006.01)

(52) U.S. Cl.
CPC ............... H02K 29/08 (2013.01); H02K 5/04 (2013.01); H02K 11/33 (2016.01); H02K 7/116 (2013.01)

(58) Field of Classification Search
CPC ............ H02K 5/04; H02K 5/15; H02K 7/116; H02K 11/33

USPC .......................................... 310/89, 406–409
See application file for complete search history.

(56) References Cited

U.S. PATENT DOCUMENTS

| 3,714,705 A * | 2/1973 | Lewis | H02K 5/1672 29/434 |
| 4,017,964 A * | 4/1977 | Schulte | H02K 5/04 29/596 |
| 4,593,217 A * | 6/1986 | Levine | H02K 17/30 310/89 |
| 4,644,204 A * | 2/1987 | Lakin | H02K 5/15 310/402 |
| 4,835,427 A * | 5/1989 | Bohm | H01L 25/115 257/687 |

(Continued)

FOREIGN PATENT DOCUMENTS

CN   202488236 U   10/2012
CN   203233258 U   10/2013
(Continued)

Primary Examiner — Quyen P Leung
Assistant Examiner — Eric Johnson
(74) Attorney, Agent, or Firm — Laurence A. Greenberg; Werner H. Stemer; Ralph E. Locher (57) ABSTRACT A motor assembly with an electric motor has a stator assembly and a motor housing, and an electronics housing. The electronics housing has a housing shell, formed as a motor carrier, for fastening the motor housing. The motor housing has a first, pot-shaped housing half. The first housing half is fastened by screw fastening action to the motor carrier such that the first housing half presses the electric motor against the motor carrier by way of a housing deformation.

13 Claims, 8 Drawing Sheets (56) References Cited

U.S. PATENT DOCUMENTS

| | | | |
|---|---|---|---|
| 6,161,274 A * | 12/2000 | Stark | H02K 5/00 |
| | | | 29/596 |
| 7,847,446 B2 | 12/2010 | Becker et al. | |
| 8,659,193 B2 * | 2/2014 | Yamasaki | H02K 11/33 |
| | | | 310/64 |
| 2002/0158524 A1 * | 10/2002 | Bobay | H02K 11/33 |
| | | | 310/68 R |
| 2011/0181221 A1 | 7/2011 | Asahi et al. | |
| 2011/0254393 A1 * | 10/2011 | Yamasaki | H02K 5/18 |
| | | | 310/64 |
| 2016/0294247 A1 | 10/2016 | Bauer | |

FOREIGN PATENT DOCUMENTS

| | | |
|---|---|---|
| DE | 102005062784 A1 | 7/2007 |
| DE | 102006032780 A1 | 1/2008 |
| DE | 102008040318 A1 | 1/2010 |
| DE | 102008028950 B4 | 10/2012 |
| DE | 102012217896 A1 | 4/2014 |
| DE | 102013225165 A1 | 6/2015 |
| WO | 2013037454 A2 | 3/2013 |
| WO | 2014076083 A2 | 5/2014 |
| WO | 2015048956 A2 | 4/2015 |

* cited by examiner

MOTOR ASSEMBLY

BACKGROUND OF THE INVENTION

FIELD OF THE INVENTION

The invention relates to a motor assembly having an electric motor comprising a stator assembly and a motor housing, and an electronics housing. The invention also relates to an actuator, in particular a gearbox actuator, for a motor vehicle, having a motor assembly of said type.

WO 2013/037454 A2 has disclosed an electric motor which may be a constituent part of an actuator for a motor vehicle gearbox, in particular for a direct shift gearbox (DSG). In the case of a hydraulic actuator, the electric motor may serve for driving a hydraulic pump.

For this purpose, the known electric motor has a cylindrical motor or stator housing in which a stator assembly is mounted so as to be fixed with respect to the housing, and a rotor together with a rotor shaft fixed to the rotor is mounted in rotationally movable fashion. For the coupling for example to the hydraulic pump of the actuator, the motor shaft is led out, so as to form a shaft stub, on one housing side of the electric motor. The opposite housing side has an attachment flange for the fastening of the actuator for example to an electronics housing of motor electronics.

BRIEF SUMMARY OF THE INVENTION

The invention is based on the object of specifying a motor assembly which permits fastening of a motor housing to an electronics housing in as simple and operationally reliable a manner as possible. It is also sought to specify an actuator for a motor vehicle having a motor assembly of said type.

According to the invention, the stated object is achieved, with regard to the motor assembly, by way of the claimed features, and, with regard to an actuator comprising the motor assembly, by way of the claimed features. The respective dependent claims relate to advantageous embodiments and refinements.

The motor assembly according to the invention has an electric motor with a metallic motor housing. The motor assembly furthermore comprises an electronics housing, wherein the electronics housing has a housing shell, formed as a motor carrier, for the fastening of the motor housing. The motor housing is equipped with a first, pot-shaped housing half, wherein said first housing half, in the assembled state, is fastened by screw fastening action to the motor carrier such that a housing deformation causes the electric motor to be pressed against the motor carrier.

In other words, by way of the screw fastening, the first housing half is braced such that an in particular elastic, at least slight, deformation of the first housing half occurs, wherein, in this way, the electric motor is fastened with non-positively locking action in the direction of the motor carrier. By way of the (housing) deformation of the first housing half, particularly operationally reliable fastening of the electric motor to the motor carrier is made possible.

As a result of the deformation, the first housing half is, in the region of the screw fastening, fastened so as to bear against the motor carrier closely and in rattle-free fashion at all times. It is thereby ensured that vibrations or oscillation loads that arise during the operation of the motor assembly do not cause cracks to form in the first housing half and/or cause the fastening screws or the threads to shear off.

In an advantageous refinement, the motor carrier has at least one screw hole for the screw fastening of the first housing half. The screw hole is drawn in axially (for example in the manner of a bead) in relation to an abutment surface, against which the first housing half bears by way of a face side, of the motor carrier. In other words, the abutment surface protrudes axially in the direction of the motor housing in relation to the motor carrier surface which is in alignment with the opening of the screw hole. In this way, as measured in the axial direction, there is a height difference between the abutment surface and the surface around the screw hole. When a screw fastening of the first housing half to the motor carrier is realized, the first housing half is at least partially pulled into the housing gap formed as a result of said height difference. The resulting bracing action gives rise to the housing deformation of the first housing half. Here, the axial direction refers in particular to the mounting direction of the motor housing on the motor carrier, and is oriented substantially parallel to the axis of rotation of a rotor shaft of a rotor of the electric motor. In a possible refinement, the height difference or the housing gap is realized for example by way of a drawn-in ring-shaped groove in the region of the screw hole.

In a preferred embodiment, the abutment surface is in particular in the form of an encircling or segmented ring-shaped surface, which protrudes axially beyond the motor carrier in the direction of the motor housing. Owing to the circular ring-shaped surface, a particularly uniform housing bracing action or housing deformation action is made possible during the course of the screw fastening process. Particularly operationally reliable and rattle-free fastening of the electric motor to the motor carrier is realized in this way.

In an expedient embodiment, for the purposes of realizing particularly simple and inexpensive assembly, a stud bolt for the screw fastening of the first housing half to the motor carrier is fastened to the first housing half. In this context, "fastened" is to be understood in particular to mean a rotationally fixed fastening of the stud bolt to the first housing half. In this embodiment, the corresponding screw hole of the motor carrier preferably does not have an internal thread, that is to say the screw hole is formed not as a threaded bore but as a simple bore or as a cutout. For assembly purposes, the stud bolt is at least partially led through the screw hole and is subsequently fastened, from the inner side of the motor carrier, by way of a nut. By virtue of the nut being tightened, the stud bolt, and thus the first housing half, are pulled into the housing gap toward the motor carrier, whereby the housing deformation is generated owing to the height difference in relation to the abutment surface. For this purpose, it is provided by way of example in one possible embodiment that a head of the stud bolt is cohesively fastened, by welding, to the first housing half.

In a particularly preferred embodiment, the stud bolt is however preferably fastened to the first housing half by way of an interference fit. For this purpose, it is for example the case that the head of the stud bolt has a knurling on the circumference, which is subsequently pressed into an associated cutout of the first housing half. In this way, particularly straightforward and inexpensive fastening of the stud bolt to the first housing half is realized, which has an advantageous effect on the production costs of the motor assembly.

In an expedient refinement, the motor housing has a second, pot-shaped housing half, wherein the second housing half is mounted onto a stator assembly of the electric motor oppositely to the first housing half. Therefore, in the assembled state, the stator assembly is substantially completely encased (engaged around) by the first and second housing halves, such that a substantially closed motor housing is formed.

In a preferred embodiment, the two housing halves are mounted, plugged or pressed onto the stator assembly with non-positively locking action. In this way, additional fastening means for the fastening of the housing halves to one another and for the fastening of the stator assembly are eliminated, such that particularly inexpensive and time-saving assembly of the motor housing is made possible.

In a suitable embodiment, the housing halves are clamped onto the stator assembly in particular by way of an interference fit. As a result of the subsequent deformation of the first housing half, it is thus the case that non-destructive, structurally simple and operationally reliable fastening of the stator assembly, and thus of the electric motor, is made possible. The occurring pressing forces of the circumferential housing half surfaces against the outer circumference of the stator assembly are, in the interference fit, dimensioned in particular so as to always be greater than a force that would arise during operation as a result of vibrations of the electric motor owing to its inherent weight. In this way, even in the presence of vibrations during the operation of the motor assembly, the first housing half always bears closely and in rattle-free fashion against the stator assembly, whereby an operationally reliable holding action is ensured.

In a particularly expedient refinement, the first housing half has a greater housing height than the second housing half as measured in the axial direction of the motor housing. In the assembled state, the first housing half is, in a preferred installation situation, weight-bearing, that is to say the first housing half bears substantially the full weight of the electric motor. As a result of the greater housing height, a correspondingly larger holding or pressing surface against the stator assembly is realized, which has an advantageous effect on the contact pressure owing to the non-positive locking action, preferably owing to the interference fit. It is thereby ensured that the stator assembly is fixed by the first housing half in particularly operationally reliable and rattle-free fashion. In a preferred refinement, the first housing half is dimensioned to be preferably twice as large as the second housing half in terms of housing height.

In a particularly stable embodiment of the motor housing, the first and the second housing half are directly mechanically connected to one another, in particular welded to one another.

For the purposes of realizing as simple and functional a construction of the motor housing as possible, it is provided in a preferred embodiment that the housing halves comprise bearings for rotatable mounting of the rotor shaft. Here, the first housing half has a fixed bearing, and the second housing half has a floating bearing. In the assembled state, the first housing half is fixedly connected to the motor carrier, such that it is particularly expedient for the fixed bearing to be arranged on the first housing half. By virtue of the fixed bearing being positioned on the first housing half, particularly high performance during the operation of the electric motor, even in the event of vibrations occurring, is thus ensured.

In other words, the bearing shields of the electric motor are integrated into the housing halves of the motor housing. The first and second housing halves are thus configured in particular as an A bearing shield and as a B bearing shield respectively of the electric motor, whereby a particularly simple and component-saving construction of the motor housing is realized. The fixed bearing and the floating bearing are for example designed as rolling bearings, in particular as ball bearings, for the rotor shaft.

In a preferred application, the motor assembly is used in an actuator, in particular in a gearbox actuator, for example for performing gearshifts in a dual-clutch gearbox or direct shift gearbox of a motor vehicle.

BRIEF DESCRIPTION OF THE SEVERAL VIEWS OF THE DRAWING

An exemplary embodiment of the invention will be discussed in more detail below on the basis of a drawing, in which.

DESCRIPTION OF THE INVENTION

Parts and dimensions which correspond to one another are denoted by the same reference designations throughout the figures.

Figure 1:
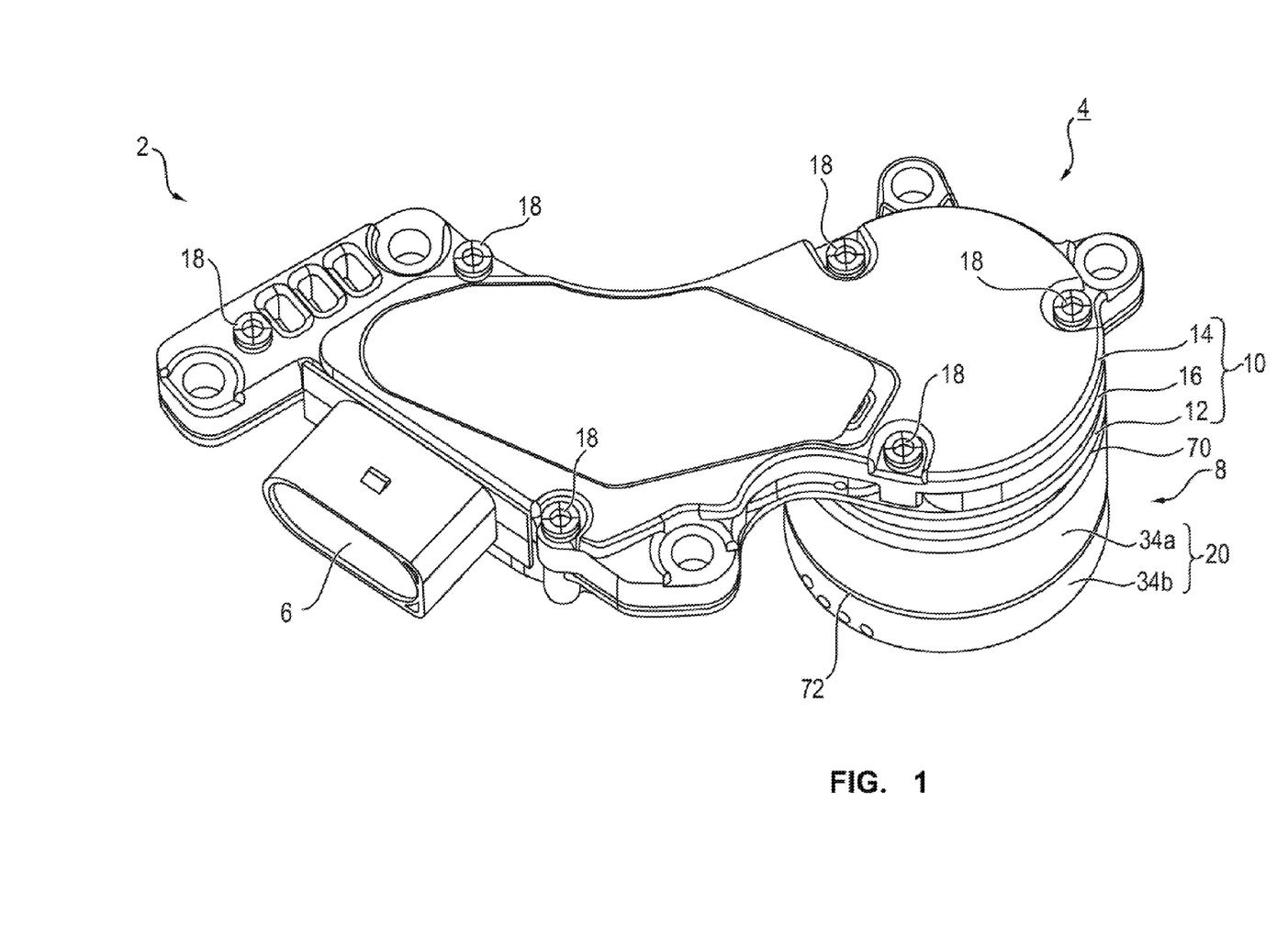
FIG. 1 shows, in a perspective illustration, a motor assembly for a gearbox actuator of a motor vehicle gearbox, comprising an electric motor and an electronics unit.

FIG. 1 illustrates a motor assembly 2 for a gearbox actuator (not illustrated in any more detail) of a motor vehicle gearbox, in particular of a direct shift gearbox. The motor assembly 2 comprises an elongate electronics unit 4 with a connecting plug connector 6 protruding at the narrow side, and comprises an electric motor 8 fastened to the electronics unit 4.

The electronics unit 4 comprises an electronics housing 10 which is formed substantially from a first housing shell, formed as a motor carrier 12, from a second housing shell, formed as a cooling cover 14, and from an electronics carrier 16, arranged in sandwich-like fashion between the motor carrier 12 and the cooling cover 14. Here, the connecting plug connector 6 is integrally formed in unipartite fashion on a face side of the electronics carrier 16. By way of the connecting plug connector 6, an inverter circuit (not illustrated in any more detail) of the electronics carrier 16 is coupled in electrically conductive fashion to motor vehicle electronics (not illustrated in any more detail) or to a motor vehicle harness for the purposes of energization and operation of the electric motor 8.

Figure 2:
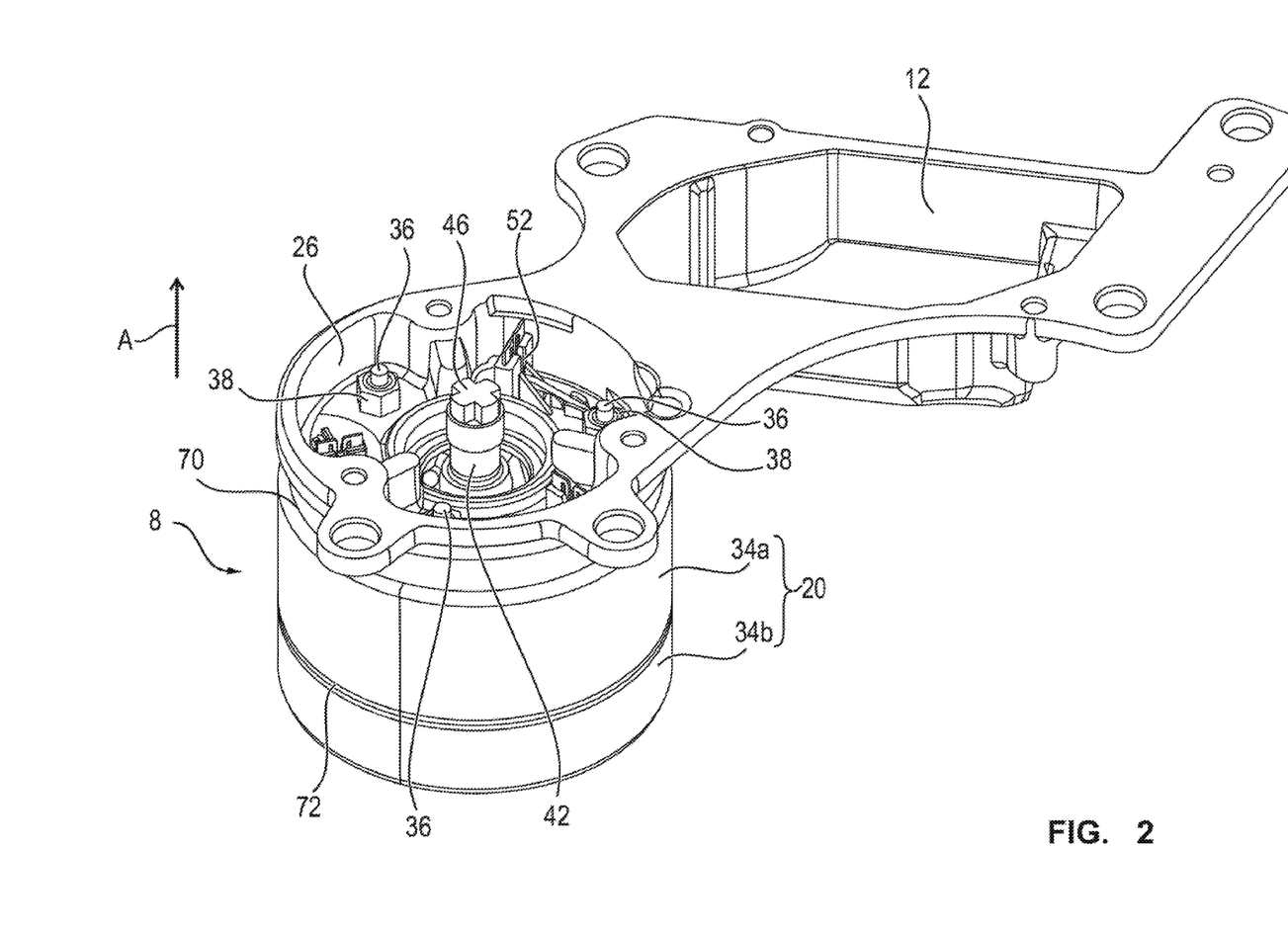
FIG. 2 shows, in a perspective illustration, a motor carrier of the electronics unit with the electric motor.

The motor carrier 12 and the cooling cover 14 are screwed together by way of six circumferentially distributed fastening screws 18, wherein the electronics carrier 16 is held clamped, or fixed by clamping, between the motor carrier 12 and the cooling cover 14. As can be seen in particular in FIG. 2, a cylindrical motor housing 20 of the preferably brushless electric motor 8 is fastened by way of screws to the motor carrier 12.

Figure 3:
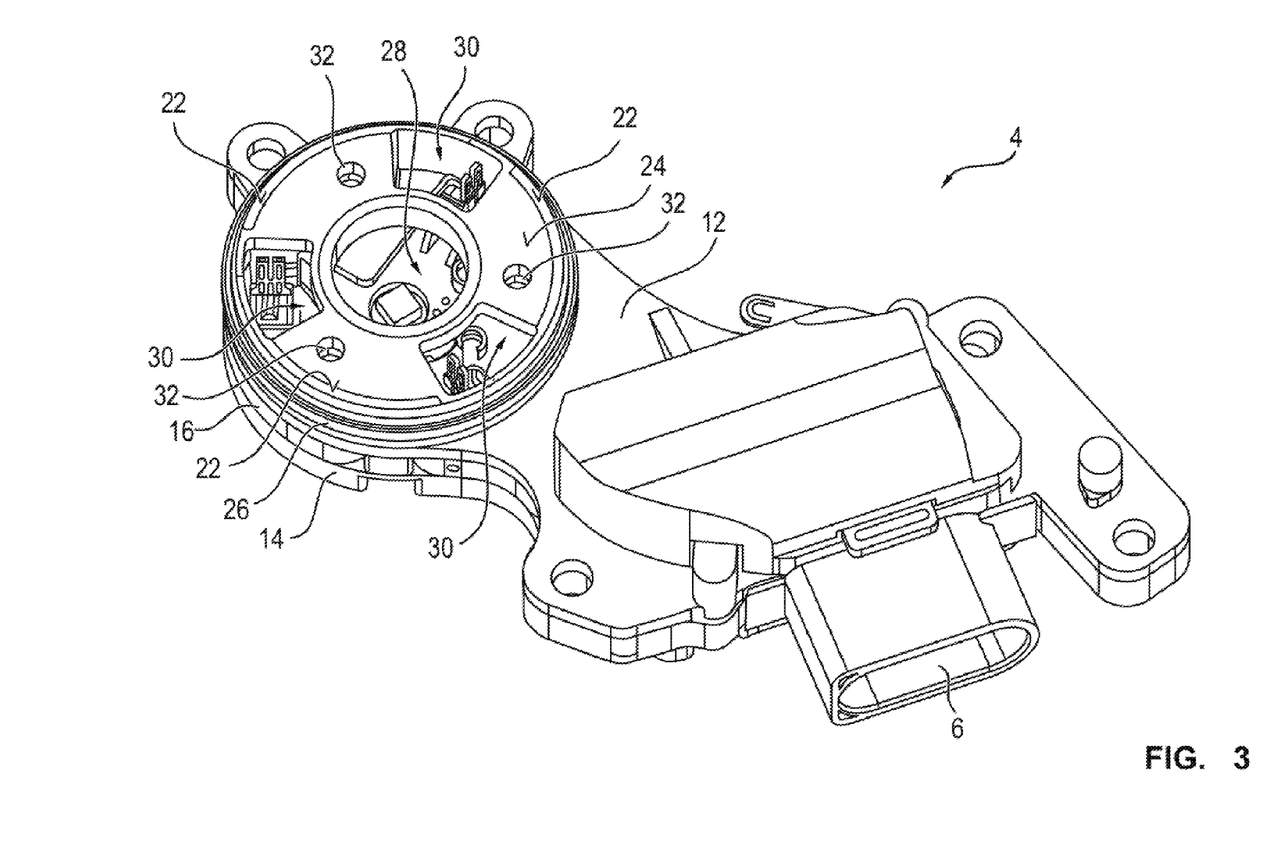
FIG. 3 shows, in a perspective illustration, the electronics unit, with a view of the motor carrier.
Figure 4:
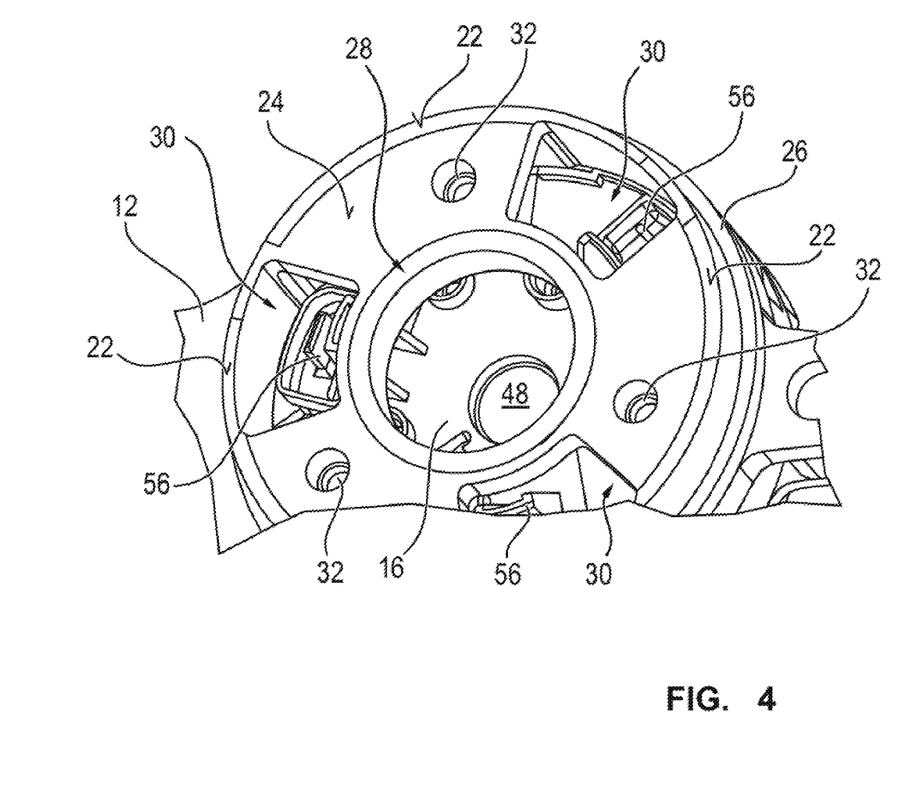
FIG. 4 shows, in a perspective illustration, a detail of an abutment surface of the motor carrier, against which a face side of a motor housing of the electric motor bears in the assembled state.

An abutment surface 22, against which a face side 25 of the motor housing 20 bears in the assembled state, of the motor carrier 12 will be discussed in more detail below on the basis of FIGS. 3 and 4. The abutment surface 22 is integrally formed on a face side 24 of an approximately pot-shaped protuberance 26 of the motor carrier 12, and projects at least partially beyond said face side along an axial direction A. During the fastening of the motor housing 20 to the motor carrier 12, the axial direction A is oriented along the mounting direction. An outer circumference of the protuberance 26 or of the abutment surface 22 is, in the assembled state, in alignment with an outer circumference of the motor housing 20 fastened to the motor carrier 12. The abutment surface 22 is in particular in the form of a segmented, ring-shaped surface 22 which is of circular ring-shaped form and which is arranged at the circumference on the face side 24.

The face side 24 has a central, circular cutout 28 and has three circumferential circular segment-shaped cutouts 30 which are arranged so as to be distributed approximately uniformly in the circumferential direction. The cutouts 30 are in particular arranged around the cutout 28 such that the cutouts 28 and 30 are approximately in the shape of an impeller. The face side 24 furthermore comprises three screw holes 32 which are likewise arranged so as to be distributed approximately uniformly in the circumferential direction, wherein in each case one screw hole 32 is positioned between two cutouts 30.

Figure 5:
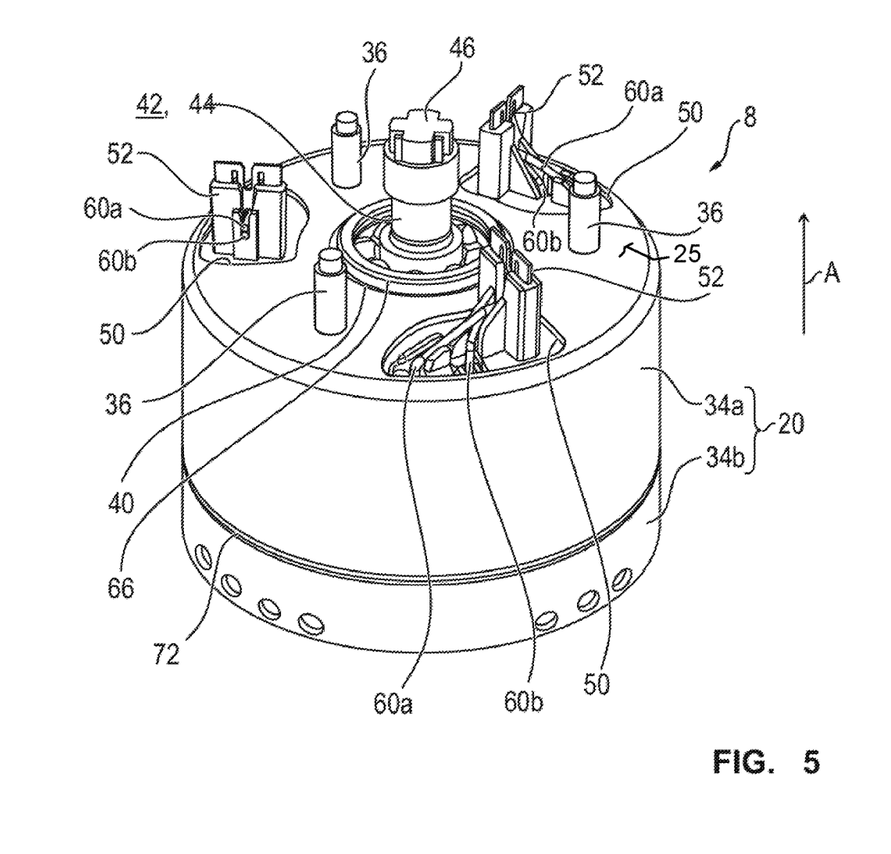
FIG. 5 shows, in a perspective illustration, the electric motor with the motor housing and with a rotor shaft coupled to a rotor.

The motor housing 20 of the electric motor 8 illustrated in FIG. 5 is formed substantially by a first, pot-shaped housing half 34a and a second, pot-shaped housing half 34b, wherein the housing half 34a is dimensioned so as to have a housing height approximately twice that of the housing half 34b as viewed in the axial direction A.

In the assembled state, the housing half 34a is fastened to the motor carrier 12 by way of three stud bolts 36, which are arranged, so as to be approximately uniformly offset with respect to one another by 120°, on the face side 25 on the surface facing toward the motor carrier 12. In the assembled state, the stud bolts 36 are, as can be seen in particular in FIG. 2, arranged in each case within one of the screw holes 32 arranged in alignment, and said stud bolts are, from the inner side of the motor carrier 12, fastened by screw fastening action by way of in each case one hexagonal nut 38. The heads (not illustrated in any more detail) of the stud bolts 36 are mechanically fastened to the face side 25 of the housing half 34a by way of an interference fit.

The housing half 34a has an approximately circular cutout 40 for a rotor shaft 42 of a rotor 44 that is coupled to said rotor shaft in terms of drive, which rotor shaft is, in the assembled state, suitably arranged in alignment with the cutout 28 of the motor carrier 12. A magnetic cap 46 as a magnetic dipole encoder is attached rotationally conjointly to the motor carrier-side face side of the rotor shaft 42. The cap 46 has a number of permanent magnets, and, in the assembled state, lies in a receptacle 48 of the electronics carrier 16. A Hall sensor element (not illustrated in any more detail) is arranged in the region of the receptacle 48, which Hall sensor element, during the operation of the motor assembly 2, monitors a motor rotational speed of the electric motor 8 by way of the alternating magnetic field of the rotating cap 46.

The housing half 34a furthermore has, on the face side 25, three oval-shaped cutouts 50 which are positioned so as to be offset radially toward an outer circumference in relation to the cutout 40. The cutouts 50 are arranged so as to be approximately uniformly circumferentially distributed around the cutout 40, wherein the cutouts 50 are, in the assembled state, arranged in alignment with the cutouts 30. In the assembled state, in each case one insulation displacement contact 52 of a stator assembly 54 of the electric motor 8 projects through each of the cutouts 50 and 30. The insulation displacement contacts 52 are, in the assembled state, contacted with in each case one motor-side blade contact 56 of the electronics carrier 16 for the energization of a rotating-field coil (not illustrated in any more detail) of the stator assembly 54.

Figure 6:
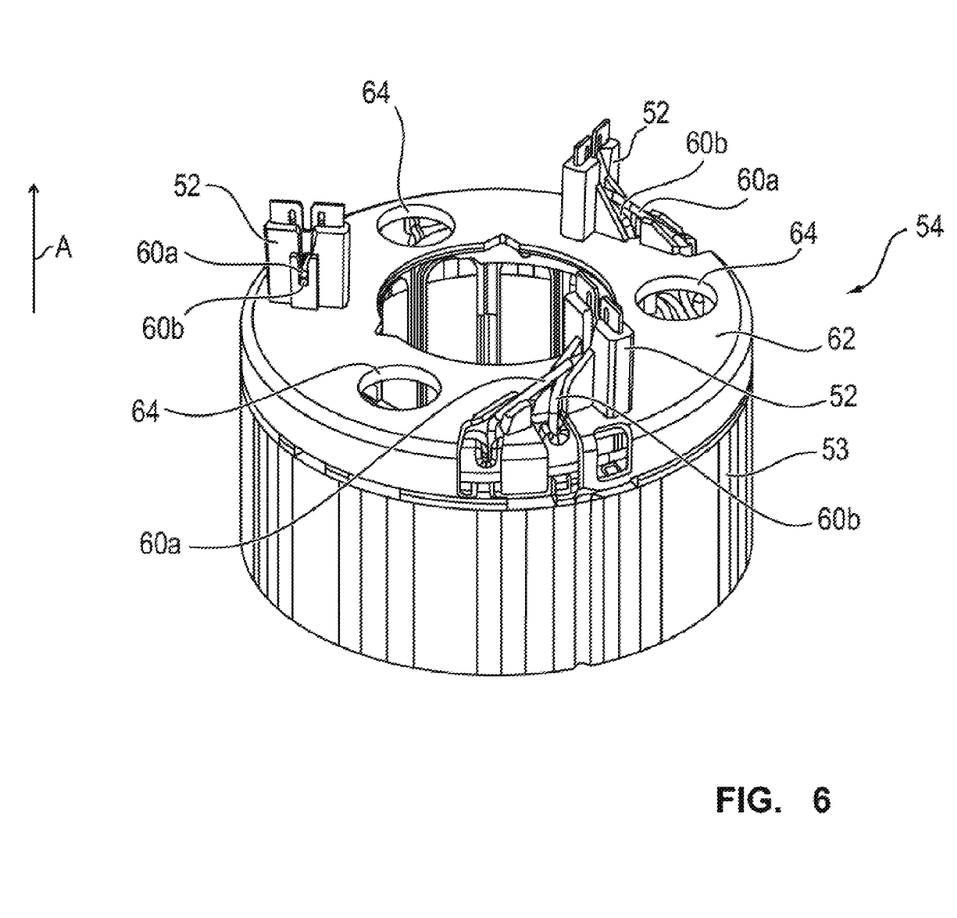
FIG. 6 shows, in a perspective illustration, a stator assembly of the electric motor.

The cylindrical stator assembly 54 illustrated in FIG. 6 substantially has a stator lamination pack 58 with the preferably three-phase rotating-field coil in the form of windings (not illustrated in any more detail). The phase coils for forming the three (rotating-field coil) phases are, at their respective phase ends 60a, 60b with the insulation displacement contacts 52 on a ring-shaped cover 62 arranged on a face side axially above the stator lamination pack 58, contacted with one another in a delta circuit.

The ring-shaped cover 62 has three circular cutouts 64 for at least partially receiving the heads of the stud bolts 36, such that the ring-shaped cover 62, in the assembled state, bears areally against the face side 25 of the housing half 34a over the greatest possible area.

Figure 7:
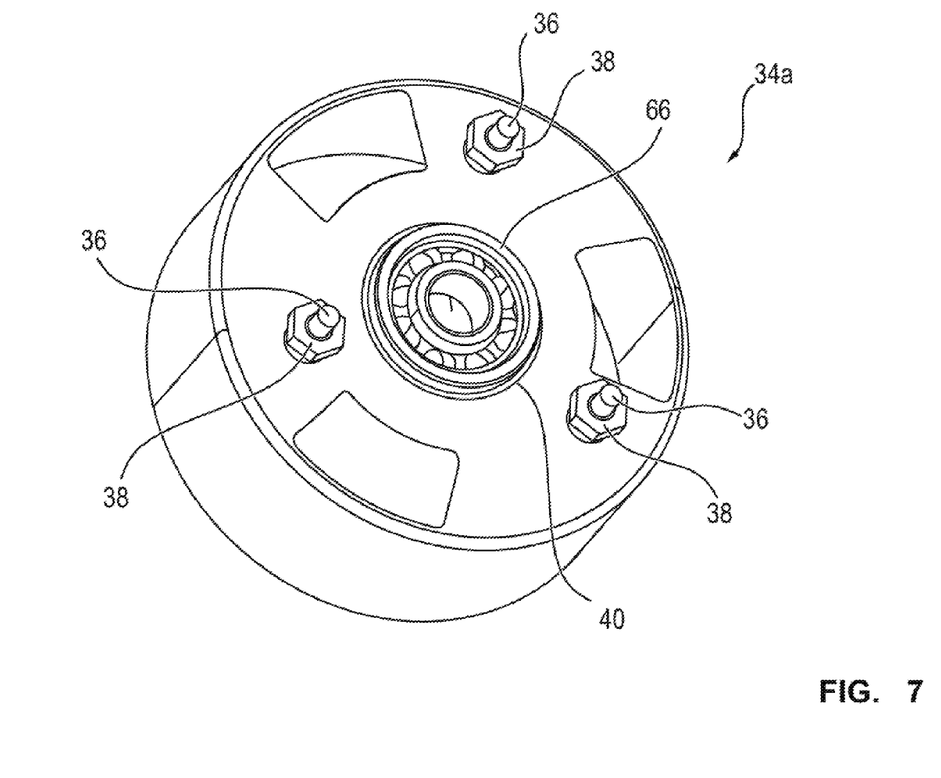
FIG. 7 shows, in a perspective illustration, a first housing half of the motor housing.
Figure 8:
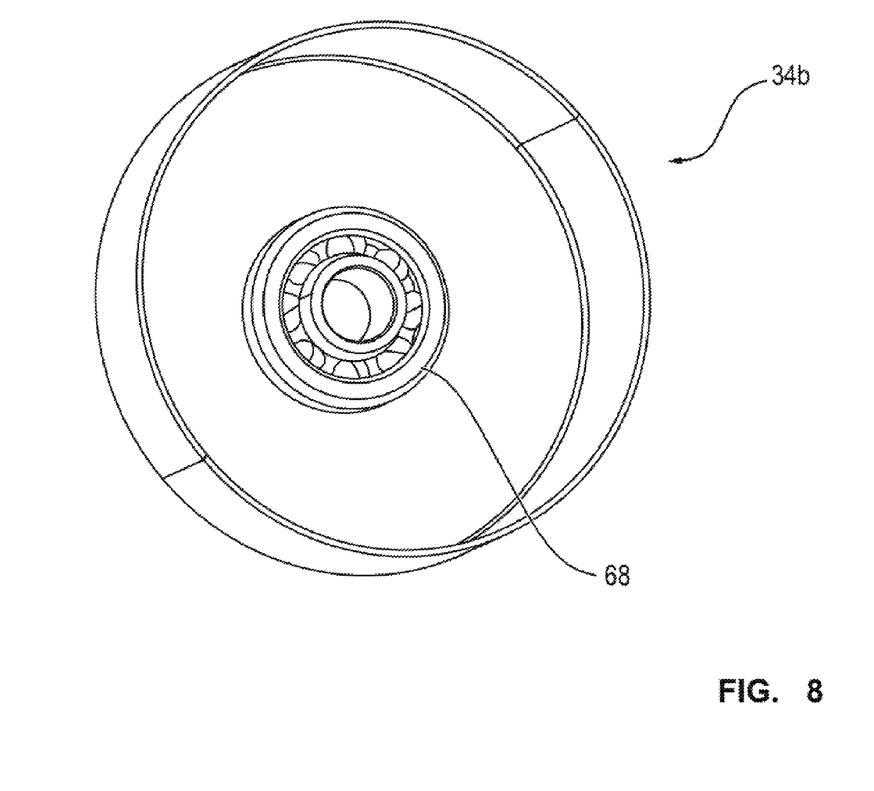
FIG. 8 shows, in a perspective illustration, a second housing half of the motor housing.

For the rotatable mounting of the rotor 44, the motor housing 20 comprises, as can be seen in particular in FIG. 7 and FIG. 8, two rolling bearings 66, 68 which are designed firstly as an A-side fixed bearing 66 of the housing half 34a and secondly as a B-side floating bearing 68 of the housing half 34b.

Thus, the housing half 34a is formed in particular as an A bearing shield, and the housing half 34b is formed in particular as a B bearing shield, of the electric motor 8, said housing halves hereinafter also being referred to as such. The floating bearing 68 and the fixed bearing 66 are expediently arranged in alignment one above the other in the axial direction A in the assembled state.

During assembly of the motor assembly 2, it is firstly the case that the rotor 44 is arranged within the stator lamination pack 58, and the phase windings of the rotating-field coil are contacted with the insulation displacement contacts 52 of the ring-shaped cover 62. Subsequently, the B-side B bearing shield 34b is plugged with non-positively locking action (preferably by way of an interference fit) onto the drive output-side face side of the stator assembly 54, such that the rotor shaft 42 is situated in the floating bearing 68. Subsequently, the A bearing shield 34a is plugged with non-positively locking action (preferably likewise by way of an interference fit) onto the stator assembly 54, and the electric motor 8 thus formed is arranged in the region of the protuberance 26 of the motor carrier 12.

For the fastening of the electric motor 8 to the motor carrier 12, the three stud bolts 36 of the A bearing shield 34a are led through the three screw holes 32 of the protuberance 26, and are fastened by screw fastening action to the motor carrier 12 by way of the hexagonal nuts 38. Here, the A bearing shield 34a bears at least partially against the segmented ring-shaped surface 22 of the face side 24, wherein the openings of the screw holes 32 on the face side 24 are arranged so as to be drawn in in an axial direction A relative to the ring-shaped surface 22.

In this way, when the stud bolts 36 with the hexagonal nuts 38 are tightened, the A bearing shield 34a is at least partially pulled into a housing gap 70 formed between the ring-shaped surface 22 and the face side 24, whereby the A bearing shield 34a is at least partially deformed in the region of its face side 25. As a result of the deformation, a bracing action is generated in the housing, such that the electric motor 8 is, in the assembled state, fixed to the motor carrier 12 in non-positively locking, rattle-free and operationally reliable fashion.

Finally, the A bearing shield 34a and the B bearing shield 34b are welded to one another circumferentially at a contact region 72 formed between the bearing shields, such that a stable and substantially closed motor housing 20 is formed.

The invention is not restricted to the exemplary embodiment described above. Rather, other variants of the invention may also be derived therefrom by a person skilled in the art, without departing from the subject matter of the invention. In particular, it is also the case that all individual features described in conjunction with the exemplary embodiment may also be combined with one another in some other way without departing from the subject matter of the invention.

List of Reference Designations

2 Motor assembly
4 Electronics unit
6 Connecting plug connector
8 Electric motor
10 Electronics housing
12 Motor carrier
14 Cooling cover
16 Electronics carrier
18 Fastening screws
20 Motor housing
22 Abutment surface/ring-shaped surface
24 Face side
26 Protuberance
28 Cutout
30 Cutout
32 Screw hole
34a Housing half/A bearing shield
34b Housing half/B bearing shield
36 Stud bolt
38 Hexagonal nut
40 Cutout
42 Rotor shaft
44 Rotor
46 Cap
48 Receptacle
50 Cutout
52 Insulation displacement contact
54 Stator assembly
56 Blade contact
58 Stator lamination pack
60a, 60b Phase ends
62 Ring-shaped cover
64 Cutout
66 Fixed bearing
68 Floating bearing
70 Housing gap
72 Contact region

The invention claimed is:

1. A motor assembly, comprising:
an electric motor;
a motor housing, said motor housing having a first, pot-shaped housing half; and an electronics housing, said electronics housing having a housing shell, formed as a motor carrier, for fastening said motor housing thereto, said motor carrier having a face side with a first surface facing said motor housing, said face side having a ring-shaped abutment surface disposed about a circumference of said face side and protruding from said first surface towards said first housing half, said first housing half bearing against said abutment surface by way of a face side of said first housing half facing said motor carrier;
said first housing half being fastened by screw fastening action to said motor carrier of a nut to a stud bolt to cause said first housing half to press said electric motor against said motor carrier by way of a housing deformation of said face side of said first housing half.

2. The motor assembly according to claim 1, wherein:
said motor carrier is formed with at least one screw hole for the screw fastening of said first housing half; and
said screw hole is drawn in axially in relation to said abutment surface.

3. The motor assembly according to claim 2, wherein said abutment surface is an encircling or segmented ring-shaped surface.

4. The motor assembly according to claim 1, wherein said stud bolt is fastened to said first housing half for the screw fastening of said first housing half to said motor carrier.

5. The motor assembly according to claim 4, wherein said stud bolt is fastened to said first housing half by way of an interference fit.

6. The motor assembly according to claim 1, wherein said electric motor has a stator assembly and said motor housing further comprises a second, pot-shaped housing half mounted on said stator assembly opposite said first housing half.

7. The motor assembly according to claim 6, wherein said first and second housing halves are plugged onto said stator assembly with an interference fit.

8. The motor assembly according to claim 6, wherein said first housing half has a greater housing height than said second housing half.

9. The motor assembly according to claim 6, wherein said first and second housing halves are directly mechanically connected to one another.

10. The motor assembly according to claim 6, wherein said first and second housing halves are welded to one another.

11. The motor assembly according to claim 6, wherein said first housing half comprises a fixed bearing and said second housing half comprises a floating bearing in which a rotor shaft of said electric motor is rotatably mounted.

12. An actuator for a motor vehicle, comprising a motor assembly according to claim 1.

13. The actuator according to claim 12, configured as a gearbox actuator.

* * * * *